(12) United States Patent
Lathrop et al.

(10) Patent No.: US 7,683,603 B1
(45) Date of Patent: Mar. 23, 2010

(54) AUTOMATIC DISCONNECT SYSTEM, TRANSFER SYSTEM AND METHOD

(75) Inventors: Todd M. Lathrop, Oakdale, PA (US);
Ronald D. Hartzel, Butler, PA (US);
David R. Welsh, Buchanan, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 12/272,068

(22) Filed: Nov. 17, 2008

(51) Int. Cl.
*G01R 1/00* (2006.01)
*G01R 21/00* (2006.01)
*H01H 47/00* (2006.01)

(52) U.S. Cl. .................. 324/110; 324/74; 324/158.1; 361/666; 307/126; 702/61

(58) Field of Classification Search .......... 324/110, 324/74, 158.1; 307/112–126; 702/61
See application file for complete search history.

(56) References Cited

U.S. PATENT DOCUMENTS

| | | | | |
|---|---|---|---|---|
| 3,818,272 A | * | 6/1974 | Rich | 361/52 |
| 6,677,742 B1 | * | 1/2004 | Voisine et al. | 324/110 |
| 7,030,514 B2 | * | 4/2006 | Wareham et al. | 307/126 |
| 2006/0221533 A1 | * | 10/2006 | Lathrop et al. | 361/160 |
| 2008/0203820 A1 | * | 8/2008 | Kramer et al. | 307/64 |

* cited by examiner

*Primary Examiner*—Ha Tran T Nguyen
*Assistant Examiner*—Emily Y Chan
(74) *Attorney, Agent, or Firm*—Martin J Moran

(57) ABSTRACT

A transfer system includes an energy meter, a transfer switch, an automatic disconnect device, and a detector. The energy meter includes an input structured to receive a first power source, and a power output. The transfer switch includes a first input electrically connected to the power output of the energy meter, a second input, an output, and a mechanism structured to transfer one of the first and second inputs to the output of the transfer switch. The automatic disconnect device includes a first input structured to receive a second power source, a second input, an output, and a mechanism structured to electrically connect or disconnect the first input and the output of the automatic disconnect device responsive to the second input. The detector is structured to detect presence of the energy meter and output a corresponding signal to the second input of the automatic disconnect device.

8 Claims, 4 Drawing Sheets

US 7,683,603 B1

AUTOMATIC DISCONNECT SYSTEM, TRANSFER SYSTEM AND METHOD

BACKGROUND

1. Field

The disclosed concept pertains generally to transfer switches and, more particularly, to transfer systems for a first power source and a second power source. The disclosed concept also pertains to an automatic disconnect system for an energy meter. The disclosed concept further pertains to methods of disconnecting power to a transfer switch.

2. Background Information

Today, more and more residential, commercial and industrial sites are employing a form of alternate (e.g., without limitation, secondary; tertiary; back up; emergency) power source to protect against primary (e.g., without limitation, utility) power source outages. When such an alternate power source (e.g., without limitation, generator; uninterruptible power supply (UPS); solar power source; wind power source) is employed, a placard, which identifies the location of the alternate power source disconnect, can be placed at the utility meter per Articles 700.8, 701.9, and 702.8 of the National Electric Code. However, this placard does not always get properly placed, if it is placed at all. This presents a potential safety issue for fire fighters, other emergency personnel, electricians and the like.

If the placard is not in place and the utility meter is pulled due to, for example, fire or work requirements, then personnel may think that the load is de-energized. However, when the meter is pulled, the installed alternate power source will act as if a normal power outage has occurred and, therefore, power the load. This may present a hazard to the personnel.

There is room for improvement in transfer systems for a first power source and a second power source.

There is also room for improvement in methods of disconnecting power to a transfer switch.

SUMMARY

These needs and others are met by embodiments of the disclosed concept, which provide an automatic disconnect device comprising a first input structured to receive a second power source, a second input, an output, and a mechanism structured to electrically connect or disconnect the first input and the output of the automatic disconnect device responsive to the second input; and a detector structured to detect presence of an energy meter and output a corresponding signal to the second input of the automatic disconnect device.

In accordance with one aspect of the disclosed concept, a transfer system comprises: an energy meter comprising an input structured to receive a first power source, and a power output; a transfer switch comprising a first input electrically connected to the power output of the energy meter, a second input, an output, and a mechanism structured to transfer one of the first and second inputs to the output of the transfer switch; an automatic disconnect device comprising a first input structured to receive a second power source, a second input, an output, and a mechanism structured to electrically connect or disconnect the first input and the output of the automatic disconnect device responsive to the second input; and a detector structured to detect presence of the energy meter and output a corresponding signal to the second input of the automatic disconnect device.

The energy meter may be a utility energy meter further comprising a meter socket and a removable meter portion; and the detector may be structured to detect presence of the removable meter portion in the meter socket.

The detector may comprise one of a normally closed contact that opens upon insertion of the removable meter portion in the meter socket, and a normally open contact that closes upon insertion of the removable meter portion in the meter socket; and the detector may output the corresponding signal to the second input of the automatic disconnect device through one of the normally closed contact and the normally open contact.

The automatic disconnect device may be a circuit interrupter comprising a shunt trip input as the second input of the automatic disconnect device.

The automatic disconnect device may be an electrically operated contactor comprising a control input as the second input of the automatic disconnect device.

The automatic disconnect device may be disposed internal to the transfer switch.

The automatic disconnect device may be disposed with the second power source.

As another aspect of the disclosed concept, an automatic disconnect system for an energy meter comprises: an automatic disconnect device comprising a first input structured to receive a power source, a second input, an output, and a mechanism structured to electrically connect or disconnect the first input and the output of the automatic disconnect device responsive to the second input; and a detector structured to detect presence of the energy meter and output a corresponding signal to the second input of the automatic disconnect device.

As another aspect of the disclosed concept, a method comprises: receiving a first power source and a different second power source at a transfer switch; detecting presence of an energy meter operatively associated with the first power source; and responsive to removal of the detecting presence, automatically disconnecting the different second power source from the transfer switch.

As another aspect of the disclosed concept, a transfer system comprises: an energy meter comprising an input structured to receive a first power source, and a power output; a transfer switch comprising a first input electrically connected to the power output of the energy meter, a second input, an output, and a mechanism structured to transfer one of the first and second inputs to the output of the transfer switch; an automatic disconnect device comprising a first input structured to receive a second power source, a second input, an output, and a mechanism structured to electrically connect or disconnect the first input and the output of the automatic disconnect device responsive to the second input; and means for detecting presence of the energy meter and outputting a corresponding signal to the second input of the automatic disconnect device, in order to automatically disconnect the different second power source from the transfer switch responsive to removal of the detecting presence.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "energy meter" means a utility energy meter; a utility meter; an energy meter for a power source; an electric meter that measures the amount of electrical energy supplied to a load (e.g., without limitation, a residence; a business; a machine; an industrial facility); a kilowatt hour meter; or a joule meter. When used, for example, in electricity retailing, a utility records the values measured by the energy meter to generate an invoice for the electricity; the energy meter may also record other variables such as, for example, the time when the electricity was used.

As employed herein, the term "transfer switch" means an apparatus that selectively powers a number of loads (or a subset of that number of loads) from a first (e.g., without limitation, primary; utility) power source or a second (e.g., without limitation, secondary; tertiary; back up; emergency; generator; UPS; solar power source; wind power source) power source. For example and without limitation, a transfer switch can allow safe switching from a utility power source to an emergency generator power source while maintaining isolation of each power source from the other. A transfer switch can be a manual switch, an automatic switch, or a combination manual and automatic switch.

As employed herein, the term "automatic disconnect device" means a circuit interrupter including a shunt trip input; a remotely controllable circuit interrupter; a remotely controllable contactor; an electrically operated contactor; a motor starter; a lighting contactor; an apparatus that automatically disconnects a power source from another apparatus; or a device of an apparatus that automatically disconnects a power source from such apparatus.

As employed herein, the term "detector" means a detection device including a plunger; a proximity switch; a proximity sensor; an apparatus structured to detect presence of another apparatus; or a device of an energy meter including a removable meter portion and a socket, base or housing in which such device is structured to detect presence of the removable meter portion in the socket, base or housing.

The disclosed concept is described in association with single-phase power sources, although the disclosed concept is applicable to power sources having any number of phases.

Figure 1:
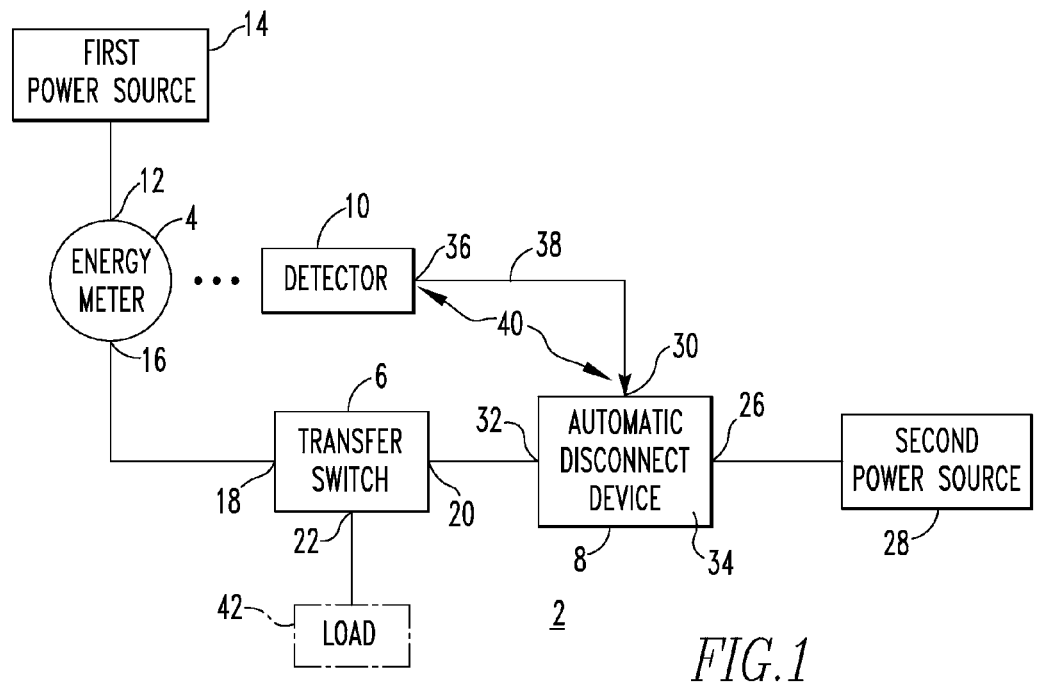
FIG. 1 is a block diagram of a transfer system in accordance with embodiments of the disclosed concept.

Referring to FIG. 1, a transfer system 2 includes an energy meter 4, a transfer switch 6, an automatic disconnect device 8, and a detector 10. The energy meter 4 includes an input 12 structured to receive a first power source 14, and a power output 16. The transfer switch 6 includes a first input 18 electrically connected to the power output 16 of the energy meter 4, a second input 20, an output 22, and a mechanism 24 structured to transfer one of the first and second inputs 18,20 to the output 22 of the transfer switch 6. The automatic disconnect device 8 includes a first input 26 structured to receive a second power source 28, a second input 30, an output 32, and a mechanism structured 34 to electrically connect or disconnect the first input 26 and the output 32 of the automatic disconnect device 8 responsive to the second input 30. The detector 10 is structured to detect presence of the energy meter 4 and output 36 a corresponding signal 38 to the second input 30 of the automatic disconnect device 8.

An automatic disconnect system 40 for the energy meter 4 includes the automatic disconnect device 8 and the detector 10.

The signal 38, which can be employed to determine presence or absence of the energy meter 4, can be used to automatically disconnect the second power source 28 from the transfer switch input 20 responsive to the absence of the energy meter 4.

The transfer switch 6 receives the first power source 14 (e.g., through the energy meter 4) and the different second power source 28 (e.g., through the automatic disconnect device 8). The detector 10 detects presence of the energy meter 4, which is operatively associated with the first power source 14. Responsive to the absence of the energy meter 4, the automatic disconnect device 8 automatically disconnects the second power source 28 from the second input 20 of the transfer switch 6.

Example 1

The example transfer system 2 provides a solution to the problem of a missing placard. The automatic disconnect system 40 provides an automatic disconnect of the second power source 28 when, for example, the energy meter 4 is absent. For example, this allows a user (e.g., through one action removing the energy meter 4) to ensure that all power sources 14,28 are removed from the load 42 (shown in phantom line drawing).

A non-limiting example of the sequence of operation is as follows. First, the energy meter 4 (e.g., a utility meter) is pulled from a meter socket (not shown) by, for example, emergency personnel or an electrician. Next, the detector 10 detects that the energy meter 4 is no longer present in the meter socket. For example, this can be accomplished by a normally closed contact (e.g., 10' of FIG. 5) that opens upon insertion of the energy meter 4 in the meter socket, a normally open contact (e.g., 10" of FIG. 6) that closes upon insertion of the energy meter 4 in the meter socket, a proximity sensor or other suitable meter presence detecting mechanism. Then, the detector 10 sends the signal 38 to the automatic disconnect device 8 using, for example, a closed contact, an open contact, or other suitable communication mechanism. For example, power for the automatic disconnect device 8 can be derived from the second power source 28. Upon receipt of the signal 38, the automatic disconnect device 8 opens.

Example 2

Figure 2:
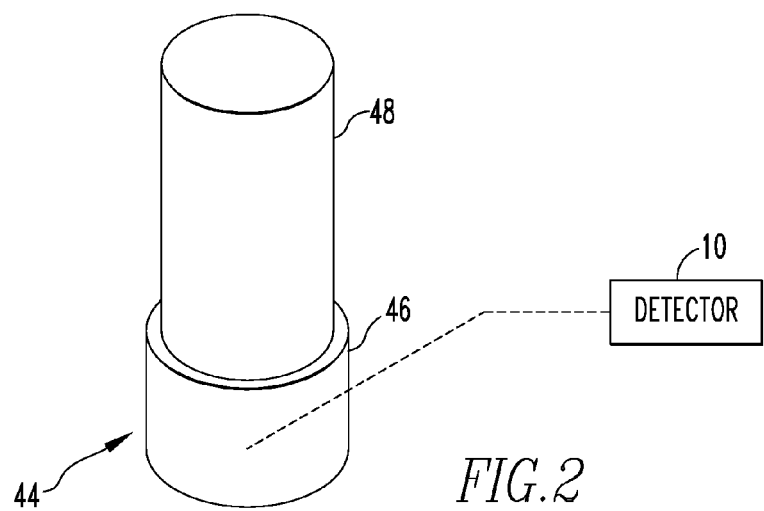
FIG. 2 is a simplified isometric view of a utility energy meter and detector therefor in accordance with an embodiment of the disclosed concept.

Referring to FIG. 2, an energy meter, such as the example utility energy meter 44 is shown. The utility energy meter 44 includes a meter socket 46 and a removable meter portion 48.

The detector 10 is structured to detect presence of the removable meter portion 48 in the meter socket 46.

Example 3

Figure 3:
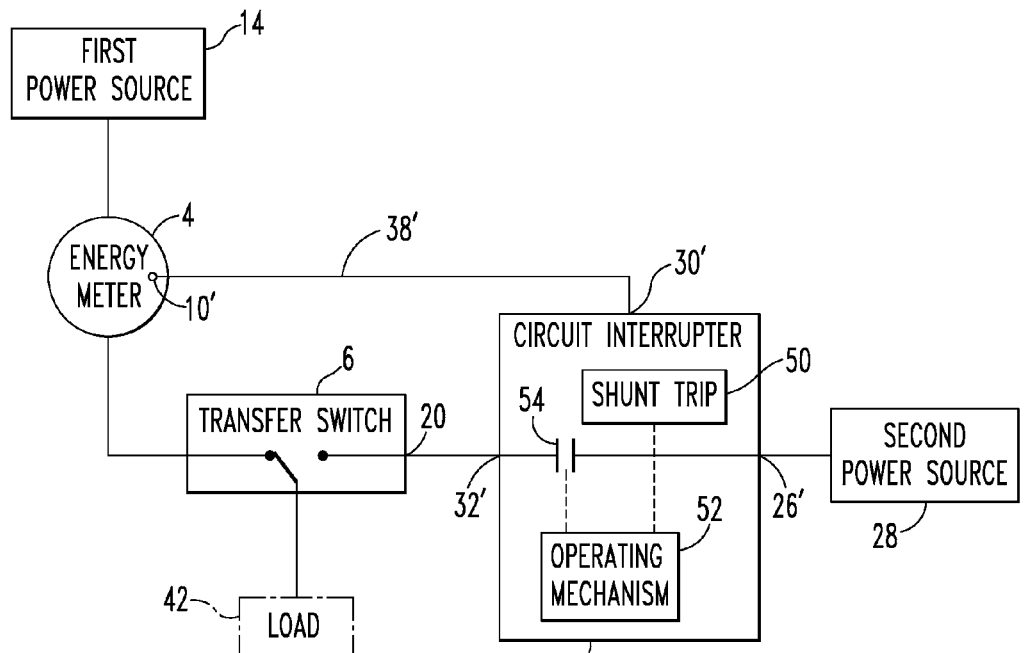
FIGS. 3 and 4 are block diagrams of transfer systems in accordance with other embodiments of the disclosed concept.

FIG. 3 shows an example automatic disconnect device, which is a circuit interrupter 8' (e.g., without limitation, a shunt trip circuit breaker; a shunt trip molded case switch), including a shunt trip mechanism 50. Upon receipt of shunt trip signal 38' from detector 10', the shunt trip mechanism 50 causes the operating mechanism 52 to trip open separable contacts 54. This electrically disconnects the first input 26' and the output 32' of the circuit interrupter 8' responsive to the shunt trip input 30'. In this example, the circuit interrupter 8' trips open and locks out (e.g., it will not automatically reclose) until it is manually closed (e.g., reset, turned off and turned on). The shunt trip input 30' and, thus, the shunt trip mechanism 50, are disabled when the detector 10' detects presence of the energy meter 4. Otherwise, the shunt trip input 30' and, thus, the shunt trip mechanism 50, are enabled when the detector 10' does not detect presence of the energy meter 4.

Preferably, the detector 10' only outputs the enabled shunt trip signal 38' when the second power source 28 is energized, as will be discussed, below, in connection with FIG. 5. The shunt trip mechanism 50 is otherwise disabled until the energy meter 4 is not present (e.g., without limitation, the removable meter portion 48 is manually pulled from the meter socket 46 of FIG. 2). If the second power source 28 becomes available at that time or any time while the energy meter 4 is not present, then the control power to the shunt trip input 30' will be provided by the second power source 28 and cause the circuit interrupter 8' to trip open, thereby isolating the second power source 28.

The example circuit interrupter 8' can be relatively more cost effective than other possible types of automatic disconnect devices depending upon the desired current and voltage ratings.

Example 4

For example, the circuit interrupter 8' is external with respect to the transfer switch 6. However, it will be appreciated that the circuit interrupter 8' could alternatively be internal to the transfer switch 6.

Example 5

Figure 4:
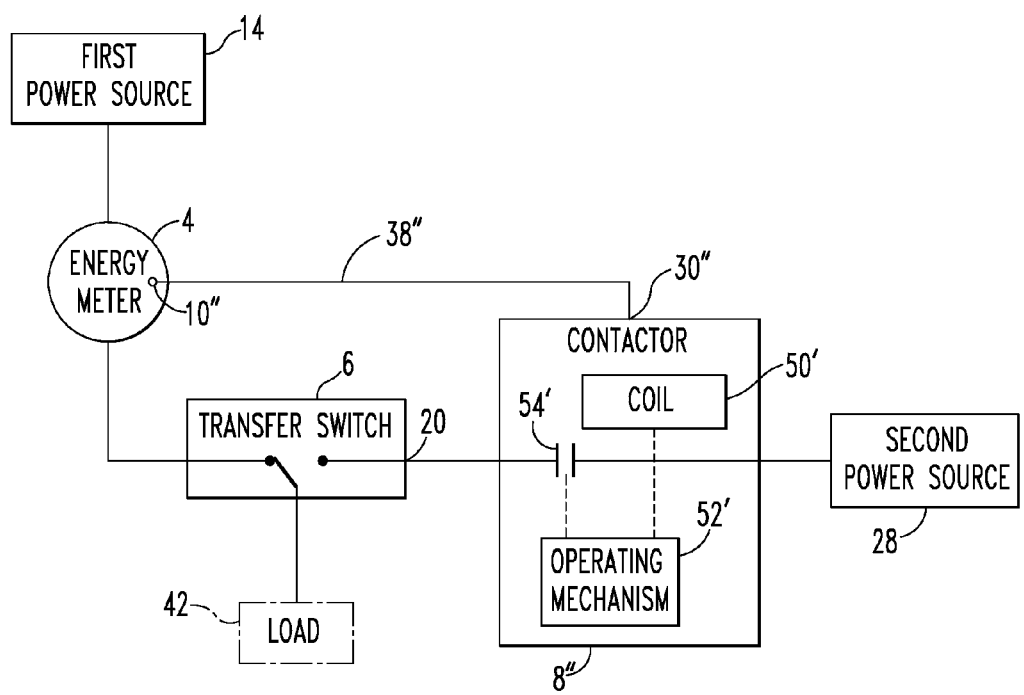

FIG. 4 shows an example automatic disconnect device, which is an electrically operated contactor 8" (e.g., without limitation, a motor starter; a lighting contactor), which includes a control input 30" and a coil 50' responsive to the control input 30". Here, automatic reset of the electrically operated contactor 8" can be achieved based upon the state of the control signal 38", as will be described.

The control signal 38" to the coil 50' is an electrical signal having one of a first state and a different second state. Responsive to the first state (e.g., de-energized) of the control signal 38", when the detector 10" does not detect presence of the energy meter 4, the separable contacts 54' of the electrically operated contactor 8" are opened by the operating mechanism 52'. Responsive to the different second state (e.g., energized), when the detector 10" detects presence of the energy meter 4, the electrically operated contactor 8" is automatically closed by the operating mechanism 52'.

Preferably, the detector 10" only outputs the first state (e.g., de-energized) of the control signal 38" when the second power source 28 is energized, as will be discussed, below, in connection with FIG. 6.

The automatic reset feature of this example embodiment is preferred in terms of convenience of reset. If the energy meter 4 is not present (e.g., without limitation, the removable meter portion 48 is manually pulled from the meter socket 46 of FIG. 2) and then is returned (e.g., without limitation, the removable meter portion 48 is manually inserted into the meter socket 46 of FIG. 2), the coil 50' is energized without any manual reset. For example, the control power for the coil 50' can go through a switch (not shown, but see NO switch 10" of FIG. 6) in the meter socket 46 (FIG. 2). If the energy meter 4 is not present, then any control power is automatically removed from the coil 50', which isolates the second power source 28.

Example 6

For example, the electrically operated contactor 8" is external with respect to the transfer switch 6. However, it will be appreciated that the electrically operated contactor 8" could alternatively be internal to the transfer switch 6.

Example 7

Figure 5:
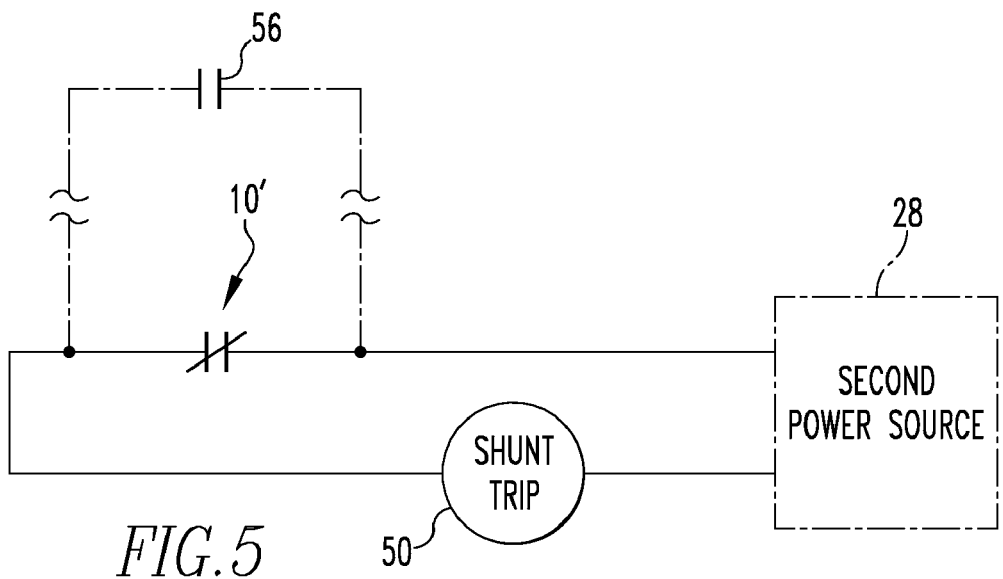
FIGS. 5 and 6 are block diagrams of detectors and automatic disconnect devices in accordance with other embodiments of the disclosed concept.

Referring to FIG. 5, the detector 10' of FIG. 3 can be a normally closed (NC) switch (e.g., without limitation, a plunger switch), which is closed when the detector 10' does not detect presence of the energy meter 4 (FIG. 1). The closed NC switch 10' is structured to energize the shunt trip coil 50 (FIG. 3) when the series combination of the closed NC switch 10' and the shunt trip coil 50 are powered from the second power source 28. When the energy meter 4 is not present (e.g., without limitation, the removable meter portion 48 is manually pulled from the meter socket 46 of FIG. 2), the NC switch 10' is closed, the shunt trip coil 50 is energized, and the voltage of the second power source 28 is removed from the load 42 of FIG. 3 since the circuit interrupter separable contacts 54 (FIG. 3) are tripped open. The NC contact switch 10' opens when the energy meter 4 is present and outputs the corresponding signal 38' (e.g., de-energized) (FIG. 3) to the shunt trip input 30' of the circuit interrupter 8' through the open NC contact thereof. Here, the shunt trip coil 50 is powered from the second power source 28, as is best seen in FIG. 5.

Example 8

As shown in FIG. 5, a remote normally open (NO) contact 56 can be electrically connected parallel to the NC switch 10'. Here, the parallel combination of the NC switch 10' and the remote normally open contact 56 are powered from the second power source 28. The remote NO contact 56, when closed, advantageously enables remote manual control of the shunt trip operation of the circuit interrupter 8' of FIG. 3.

Example 9

Figure 6:
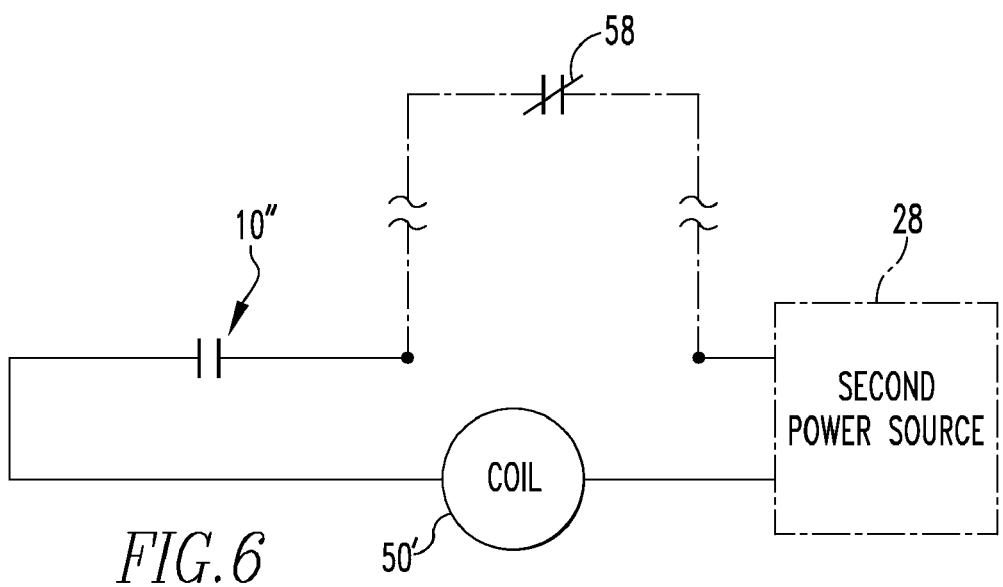

Referring to FIG. 6, the detector 10" of FIG. 4 can be a normally open (NO) switch (e.g., without limitation, a plunger switch), which is open when the detector 10" does not detect presence of the energy meter 4 (FIG. 1). When the energy meter 4 is not present (e.g., without limitation, the removable meter portion 48 is manually pulled from the meter socket 46 of FIG. 2), the NO switch 10" is open. This provides the first state (e.g., without limitation, de-energized) of the control input 30" of the electrically operated contactor 8", in order to remove the voltage of the second power source 28 from the load 42 (FIG. 4). The NO contact switch 10" closes when the energy meter 4 is present and outputs the corresponding signal 38" to the control input 30" of the electrically operated contactor 8" through the closed NO contact thereof. Here, the control coil 50' is powered from the second power source 28, as is best seen in FIG. 6.

Example 10

As shown in FIG. 6, a remote NC contact 58 can optionally be electrically connected in series with the NO switch 10". Here, the series combination of the NO switch 10" and the remote NC contact 58 are powered from the second power source 28. The remote NC contact 58, when open, advantageously de-energizes the control input 30" of the electrically operated contactor 8", in order to remove the voltage of the second power source 28 from the load 42 (FIG. 4).

Example 11

Figure 7:
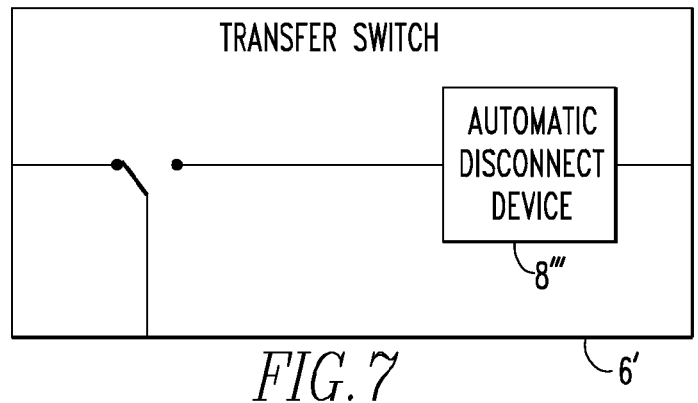
FIG. 7 is a block diagram of a transfer switch including an internal automatic disconnect device in accordance with another embodiment of the disclosed concept.

Referring to FIG. 7, automatic disconnect device 8''', which can be the same as or similar to the automatic disconnect device 8 of FIG. 1, is disposed internal to transfer switch 6'.

Example 12

Figure 8:
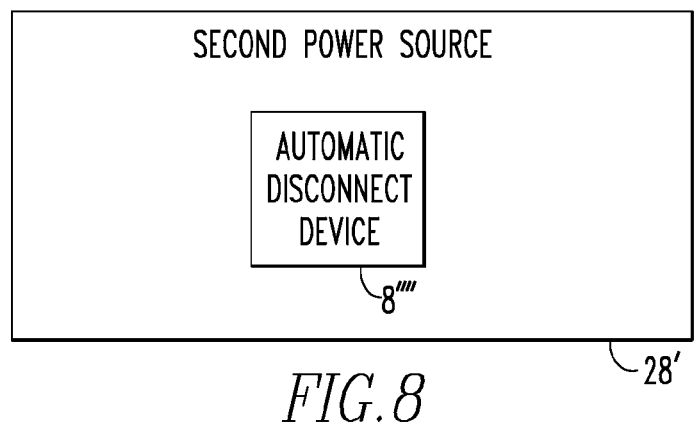
FIG. 8 is a block diagram of an automatic disconnect device for a power source, such as a generator, in accordance with another embodiment of the disclosed concept.

FIG. 8 shows automatic disconnect device 8'''', which can be the same as or similar to the automatic disconnect device 8 of FIG. 1, disposed with a second power source 28'. For example, the second power source 28' can be a generator, and the automatic disconnect device 8'''' is disposed proximate, on or internal to the generator. In this embodiment, the automatic disconnect device 8'''' can be used to either remove the voltage output by the generator to the load (e.g., 42 of FIG. 1), or to remove the start signal (not shown) input to the generator from the transfer switch (e.g., 6 of FIG. 1) (e.g., such that a no-start (either automatic start or manual start) condition occurs).

Example 13

Figure 9:
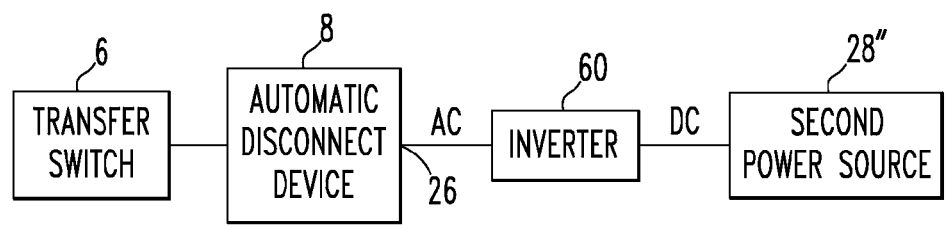
FIG. 9 is a block diagram of an automatic disconnect device and an inverter for an uninterruptible power supply (UPS) in accordance with another embodiment of the disclosed concept.

FIG. 9 shows an inverter 60 disposed between second power source 28" (e.g., a direct current (DC) power source) and the first input 26 of the automatic disconnect device 8. The inverter 60 provides an alternating current (AC) output, where the second power source 28" is a DC power source (e.g., without limitation, a UPS; solar power source; wind power source).

Example 14

In Examples 8 and 10, the disclosed automatic disconnect devices 8,8',8" can allow for the user to also remotely control power from the second power source 28 to the load 42. For example, SCADA, emergency STOP buttons, or other suitable mechanisms can either be placed in parallel (e.g., in the case of the NC switch 10') or in series (e.g., in the case of the NO switch 10") with the detector 10 (FIGS. 1 and 2) (e.g., which can advantageously be mounted in the meter base or meter socket 46 (FIG. 2)). This does not remove functionality from the energy meter 4, but allows the user to place a remote disconnect input in a location that is convenient for the user.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A transfer system comprising:
   an energy meter comprising an input structured to receive a first power source, and a power output;
   a transfer switch comprising a first input electrically connected to the power output of said energy meter, a second input an output, and a mechanism structured to transfer one of said first and second inputs to the output of said transfer switch;
   an automatic disconnect device comprising a first input structured to receive a second power source, a second input, an output, and a mechanism structured to electrically connect or disconnect the first input and the output of said automatic disconnect device responsive to said second input;
   a detector structured to detect presence of said energy meter in said input structure and to output a corresponding signal to the second input of said automatic disconnect device;
   wherein said energy meter is a utility energy meter further comprising a meter socket and a removable meter portion; and wherein said detector is structured to detect presence of said removable meter portion in said meter socket; and
   wherein said detector comprises one of a normally closed contact that opens upon insertion of said removable meter portion in said meter socket, and a normally open contact that closes upon insertion of said removable meter portion in said meter socket; and wherein said detector outputs said corresponding signal to the second input of said automatic disconnect device through one of said normally closed contact and said normally open contact.

2. A transfer system comprising:
   an energy meter comprising an input structured to receive a first power source, and a power output;
   a transfer switch comprising a first input electrically connected to the power output of said energy meter, a second input, an output, and a mechanism structured to transfer one of said first and second inputs to the output of said transfer switch;
   an automatic disconnect device comprising a first input structured to receive a second power source, a second input, an output, and a mechanism structured to electrically connect or disconnect the first input and the output of said automatic disconnect device responsive to said second input;
   a detector structured to detect presence of said energy meter in said input structure and to output a corresponding signal to the second input of said automatic disconnect device;
   wherein said automatic disconnect device is a circuit interrupter comprising a shunt trip input as the second input of said automatic disconnect device; and
   wherein said detector is a normally closed switch, which is closed when said detector does not detect presence of said energy meter; wherein the closed normally closed switch is structured to energize said shunt trip input;

wherein a remote normally open contact is disposed parallel to said normally closed switch; and wherein the normally closed switch and the remote normally open contact are powered from said second power source.

3. A transfer system comprising:

an energy meter comprising an input structured to receive a first power source, and a power output;

a transfer switch comprising a first input electrically connected to the power output of said energy meter, a second input, an output, and a mechanism structured to transfer one of said first and second inputs to the output of said transfer switch;

an automatic disconnect device comprising a first input structured to receive a second power source, a second input, an output, and a mechanism structured to electrically connect or disconnect the first input and the output of said automatic disconnect device responsive to said second input;

a detector structured to detect presence of said energy meter in said input structure and to output a corresponding signal to the second input of said automatic disconnect device;

wherein said automatic disconnect device is an electrically operated contactor comprising a control input as the second input of said automatic disconnect device; and wherein said corresponding signal to the second input of said automatic disconnect device is an electrical signal having one of a first state and a different second state; wherein responsive to the first state of said electrical signal, said electrically operated contactor is open; and wherein responsive to the different second state of said electrical signal, said electrically operated contactor is automatically closed.

4. The transfer system of claim 3 wherein the control input of said electrically operated contactor is in the different second state when said detector detects presence of said energy meter.

5. The transfer system of claim 3 wherein the control input of said electrically operated contactor is in said first state when said detector does not detect presence of said energy meter or when said second power source is de-energized.

6. The transfer system of claim 3 wherein said detector is a normally open switch, which is open when said detector does not detect presence of said energy meter; wherein the open normally open switch is structured to provide the first state of the control input of said electrically operated contactor; wherein a remote normally closed contact is disposed in series with said normally open switch; and wherein the series combination of said remote normally closed contact and said normally open switch is powered from said second power source.

7. The transfer system of claim 3 wherein said electrically operated contactor further comprises a coil responsive to said control input; and wherein the different second state of the control input of said electrically operated contactor energizes said coil when said detector detects presence of said energy meter.

8. The transfer system of claim 3 wherein said electrically operated contactor further comprises a coil responsive to said control input; and wherein the first state of the control input of said electrically operated contactor de-energizes said coil when said detector does not detect presence of said energy meter.

\* \* \* \* \*